United States Patent
Luce

(10) Patent No.: US 8,448,899 B2
(45) Date of Patent: *May 28, 2013

(54) TORQUE LINK WITH SHIMMY DAMPER

(75) Inventor: William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,561

(22) Filed: Sep. 14, 2012

(65) Prior Publication Data

US 2013/0009003 A1   Jan. 10, 2013

Related U.S. Application Data

(63) Continuation of application No. 12/818,040, filed on Jun. 17, 2010, now Pat. No. 8,292,218.

(51) Int. Cl.
*B64C 25/50* (2006.01)
*B64C 25/58* (2006.01)
*F16F 15/00* (2006.01)

(52) U.S. Cl.
USPC .................................. 244/100 R; 244/104 FP

(58) Field of Classification Search
USPC .................. 244/100 R, 102 R, 102 A, 103 R, 244/104 R, 104 FP
See application file for complete search history.

(56) References Cited

U.S. PATENT DOCUMENTS

| | | | | |
|---|---|---|---|---|
| 2,372,710 | A | * | 4/1945 | Chisholm, Jr. .......... 244/104 FP |
| 3,430,896 | A | * | 3/1969 | Labrecque ................ 244/103 R |
| 3,807,667 | A | * | 4/1974 | Lucien et al. ............. 244/102 R |
| 4,422,602 | A | * | 12/1983 | Turiot ....................... 244/102 R |
| 8,292,218 | B2 | * | 10/2012 | Luce ......................... 244/100 R |
| 2006/0278755 | A1 | * | 12/2006 | Bachmeyer et al. ............ 244/50 |
| 2009/0224100 | A1 | * | 9/2009 | Luce ......................... 244/104 R |

* cited by examiner

*Primary Examiner* — Rob Swiatek
*Assistant Examiner* — Marc Burgess
(74) *Attorney, Agent, or Firm* — Edwards Wildman Palmer LLP; Scott D. Wofsy; Joshua L. Jones

(57) ABSTRACT

A torque link includes a spring-damper system structurally incorporated into the design and functionality of the torque link. The spring portion may take the form of a structurally rigid beam while the damping portion may take the form of a damping mechanism or assembly. The damping mechanism is configured to damp out deformations in the beam and also configured to bottom out and become a structural tension/compression member when the load through the torque link exceeds a threshold load. The method damping may take a number of forms, such as, but not limited to, solid media damping, fluid damping with or without an orifice, a hydraulic or magnetic circuit, coulomb damping, etc.

20 Claims, 7 Drawing Sheets

TORQUE LINK WITH SHIMMY DAMPER

CROSS REFERENCE TO RELATED APPLICATIONS

The subject application is a continuation of U.S. application Ser. No. 12/818,040, filed Jun. 17, 2010, which is incorporated by reference herein in its entirety.

FIELD OF THE INVENTION

This invention relates to a torque link for a landing gear system, and more specifically a torque having a shimmy damper mechanism.

BACKGROUND OF THE INVENTION

As shown in FIG. 1, a torque link assembly 10 attaches to a landing gear system 12 of an aircraft 14. The torque link assembly 10 includes an upper torque link 16 and a lower torque link 18. As illustrated, the torque link assembly 10 provides a connection between an upper landing gear strut and a lower piston. Because the piston can rotate freely in the strut, a wheel 20 mounted to it needs to be held firm to keep the aircraft rolling in a straight line. Conversely, when taxiing at low speed, say, on lineup or landing rollout, this wheel can be used to steer the aircraft 14 while on the ground. The torque link assembly 10 keeps the piston in line with the strut and, when connected to an actuator, permits controlled steering of aircraft 14 on the ground.

Wheel shimmy is a condition in which the landing gear wheel or wheels oscillate from side to side along a straight line parallel to the direction of travel of the aircraft and/or rotates back and forth about the strut centerline. Wheel shimmy can be caused by a number of conditions such as low torsional stiffness, excessive freeplay in the landing gear, wheel imbalance, or worn parts. Often, however, wheel shimmy occurs even in new aircraft due to resonance between the landing gear and the airframe of the aircraft. This resonance may not be discovered until after a new aircraft is first flown and the design of the landing gear and airframe is well established. Solving a shimmy problem after an aircraft is built presents challenges because it is not usually economical to redesign and replace the landing gear in order to solve the problem. Plus increasing landing gear stiffness can typically only be accomplished with a significant weight increase. Accordingly, several different concepts have been developed for reducing or eliminating wheel shimmy in existing landing gear.

For example, hydraulic shimmy dampers have been used to damp wheel shimmy. One common method to damp shimmy consists of a hydraulic shock absorber mounted between components of the landing gear to damp shimmy motions. The hydraulic shock absorber generally consists of a hollow tube filled with oil. A rod and piston move through the fluid to generate velocity-dependent, viscous-damping forces and is typically spring loaded to the center position. Such designs require frequent maintenance, and temperature increases can reduce damping efficiency. Further, such shimmy dampers generally do not permit 360 degree rotation of the wheel or wheels and typically are difficult to adjust to provide different levels of damping.

Another type of shimmy damper that has been used in the past is a friction-type shimmy damper that mechanically engages a steering collar gear on a landing gear strut. For example, one design includes a belleville spring washer compressed against the steering collar to damp rotation thereof. While such a shimmy damper may be functionally adequate, it is not readily retrofittable to existing landing gear assemblies and installation and/or removal of the belleville spring washers typically requires the landing gear to be substantial disassembled, as many of these types of dampers require the spring washers to be telescoped over the landing gear strut.

Hydraulic damping (by addition of a restrictor) is also used as a feature of the many hydraulic steering actuation systems as a method to attenuate shimmy vibration. This method is popular on steerable nose landing gears as it adds the least additional weight and is generally effective. In cases where the hydraulic restrictor is not effective due to distance from the vibration source or flexibility of the structural load paths from the actuation system to the vibration, other methods may be required. This method is not an option for main landing gears which do not employ steering actuation.

SUMMARY OF THE INVENTION

A torque link for an aircraft landing gear system incorporates a spring-damper system that includes a pair of cooperating arms. One arm may take the form of a structural, load carrying member, such as a beam, and the other arm may take the form of a damper assembly. The arms are located between a clevis portion and a lug portion of the torque link. The load carrying member cooperates with the damper assembly to allow some deformation that can be damped out by the damper assembly. In one embodiment, the damper assembly may be bottomed out when subjected to excessive loads and then operate as rigid, structural link between the clevis and lug portions. The torque link may advantageously provide a dual role as a structural torque link as well as shimmy damping system.

In one example of the invention, a torque link for a landing gear system includes a clevis portion; a lug portion distally located from the clevis portion; and a shimmy damper assembly having two load carrying arms each extending substantially between the clevis portion and the lug portion, the first arm comprising a beam member having adequate strength and stiffness, the second arm comprising a damper assembly, wherein the beam member and damper assembly cooperate as a spring-damper system integrated into the torque link.

In another example of the invention, a torque link for a landing gear system includes a clevis portion; a lug portion distally located from the clevis portion; a rigid beam member extending between the clevis portion and the lug portion, the rigid beam arranged as a first arm of the torque link; and a shimmy damper mechanism coupled to the clevis portion and the lug portion, the shimmy damper arranged as a second arm of the torque link, the shimmy damper mechanism configured to dampen deflections of the rigid beam member under loading up to a first threshold and also configured to operate as a rigid structural member under loading that exceeds the first threshold.

In yet another example of the invention, a method of handling shimmy vibrations in a landing gear system includes the steps of (1) taxiing an aircraft over a surface; (2) transferring load through a torque link; (3) inducing an amount of deformation in a beam member that operates as first structural arm of the torque link; and (4) damping out at least some of the deformation with a damping assembly that operates a second structural arm of the torque link, wherein the beam member and damping assembly cooperate to provide a spring-damper system integrated into the torque link.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

In the following description, certain specific details are set forth in order to provide a thorough understanding of various embodiments of the invention. However, one skilled in the art will understand that the invention may be practiced without these details. In other instances, well-known structures associated with aircraft, aircraft landing gear systems, torque links or torque links, and damping mechanisms along with the operation thereof have not necessarily been shown or described in detail to avoid unnecessarily obscuring descriptions of the embodiments of the invention.

The following description generally relates to a torque link, also referred to as a torque arm, having a spring-damper system structurally incorporated into the design and functionality of the torque link. The spring portion may take the form of a structurally rigid beam while the damping portion may take the form of a damping mechanism or assembly, and where each portion functions as a structural arm of the torque link. It is appreciated that the aspects and embodiments of the torque link described herein may be utilized in the landing gear system as the upper torque link, the lower torque link, or both.

Figure 1:
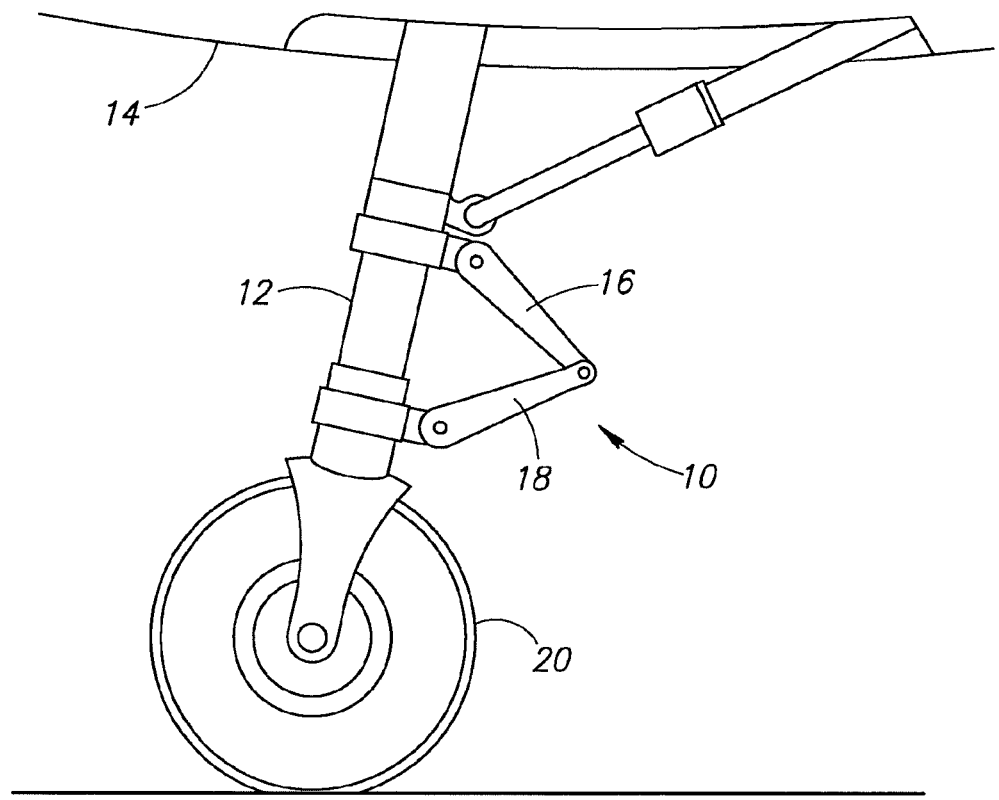
FIG. 1 shows a conventional torque link system for a nose landing gear.
Figure 2A:
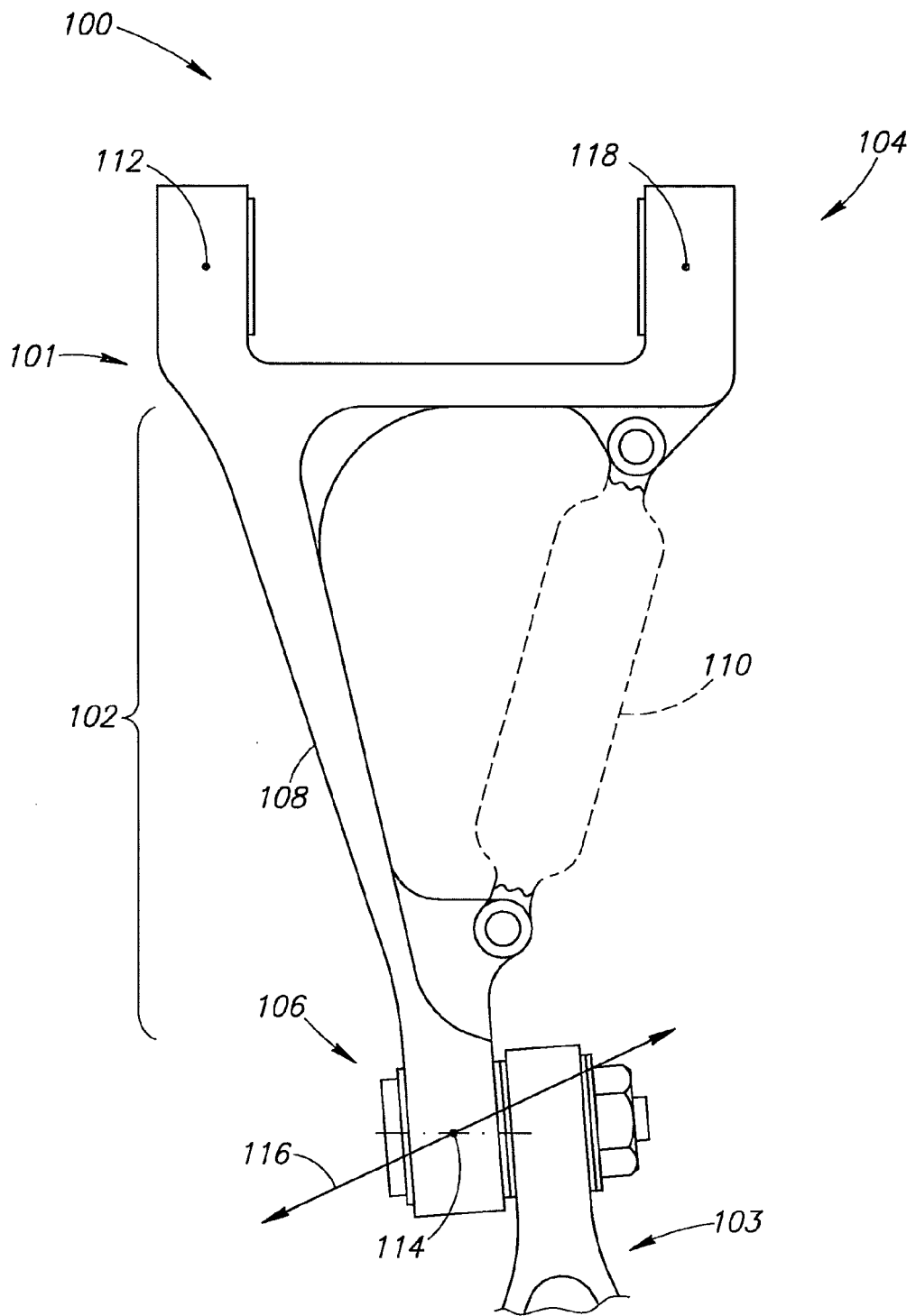
FIG. 2A shows a top, plan view of a torque link assembly for a landing gear system having structural arms that cooperate as a spring-damper system integrated into the torque link assembly according to an embodiment of the present invention.

FIG. 2A shows a torque link assembly 100 that performs a dual role as both a structural torque link and a spring-damper system 102. The torque link assembly 100 may include an upper torque link 101 and a lower torque link 103. In one embodiment, the torque link assembly 100 includes a clevis portion 104 distally located from a lug portion 106. Referring specifically to the upper torque link 101, a structural beam member 108 extends between the clevis portion 104 and the lug portion 106. In addition, a damping mechanism or assembly 110 is positioned between the clevis portion 104 and the lug portion 106 and operates with the structural beam member 108.

The beam member 108 may take the form of a rigid beam that operates as a double cantilevered beam, which may be mechanically fixed to both the clevis and lug portions 104, 106, respectively, or may be integrally machined or otherwise formed therewith. In one embodiment, the beam member 108 may be structurally tuned by selecting a desired, uniform cross-section for the beam member. In another embodiment, the beam member 108 may be structurally tuned by selecting a cross-section that varies or tapers along its length. In addition or alternatively, different types of cross-sectional shapes may be selected to achieve adequate strength and desired stiffness (or bending resistance), for example. Further tuning of the beam member 108 may be achieved by selecting other desired properties of the beam material, such as, but not limited to, strength, ductility, and fracture toughness.

Figure 2B:
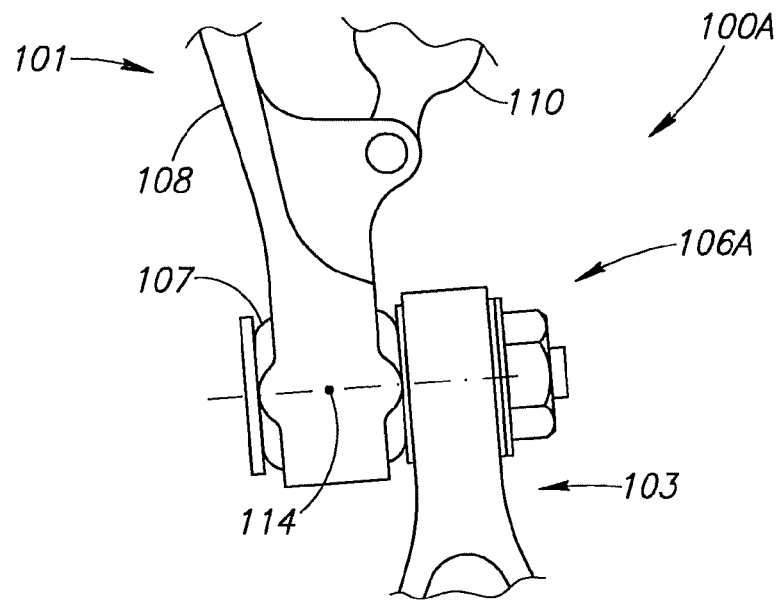
FIG. 2B shows a top, plan, partial view of yet another torque link assembly having a spherical bearing to account for misalignment according to another embodiment of the present invention.
Figure 2C:
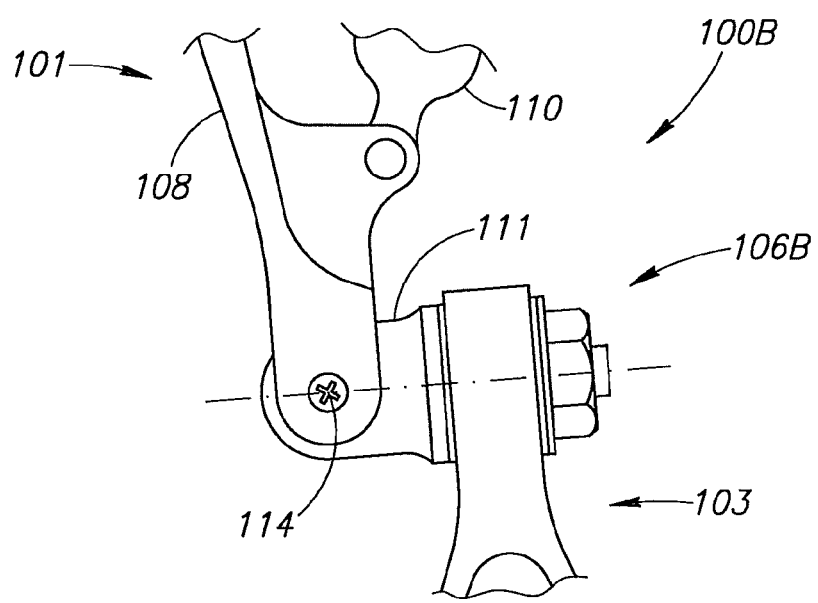
FIG. 2C shows a top, plan, partial view of another torque link assembly having a U-joint to account for misalignment according to another embodiment of the present invention.

FIGS. 2B and 2C show torque links 100A, 100B, respectively, each having different alternatives for a misalignment capable joint 106A or 106B for coupling the upper torque link 101 to the lower torque link 103. By way of example, FIG. 2B shows a spherical bearing 107 coupled to the upper torque link 101. FIG. 2C shows a U-joint mechanism 111 coupled to both the upper torque link 101 and the lower torque link 103.

Figure 3A:
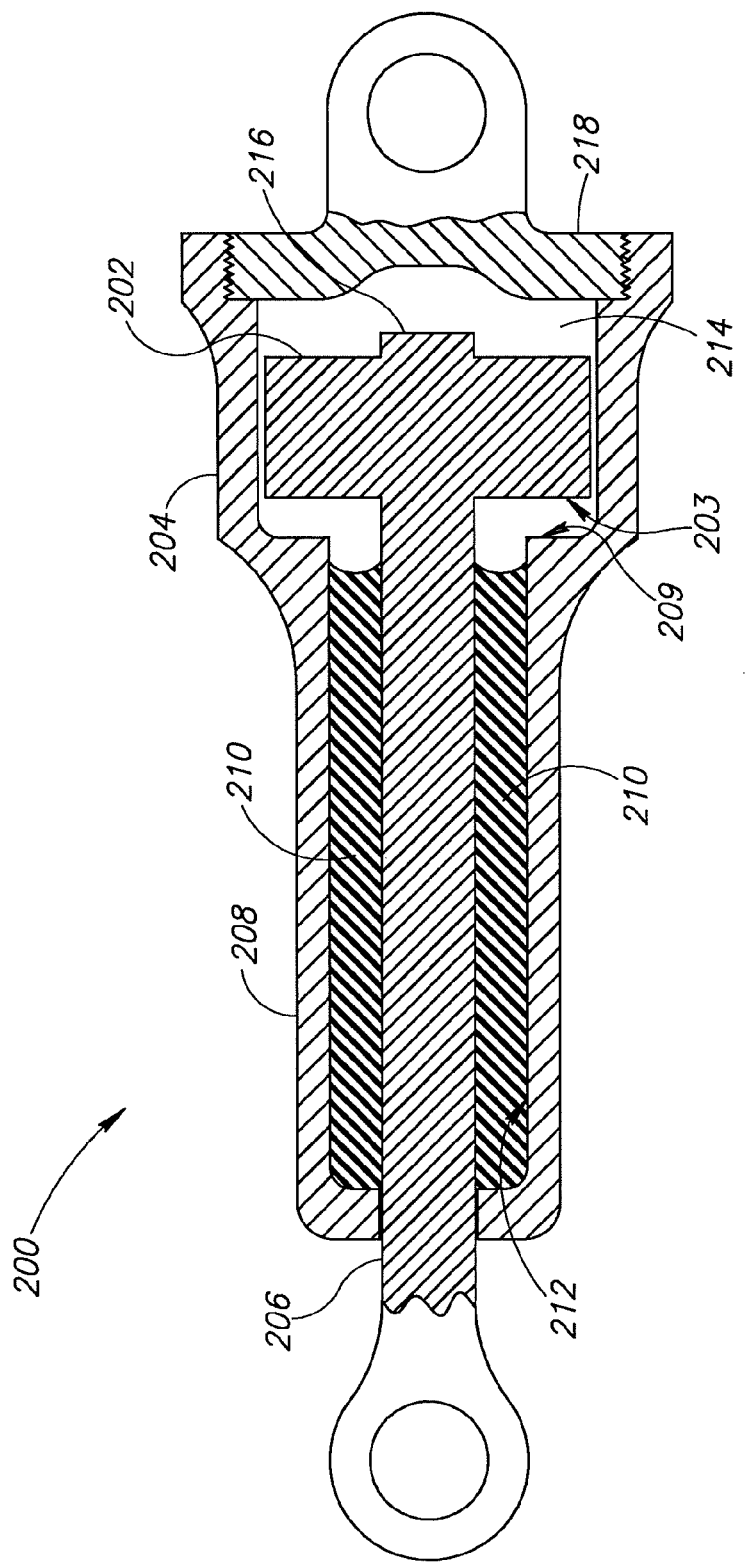
FIG. 3A shows a schematic, cross-sectional view of a damping assembly having a solid damping material according to an embodiment of the present invention.
Figure 3B:
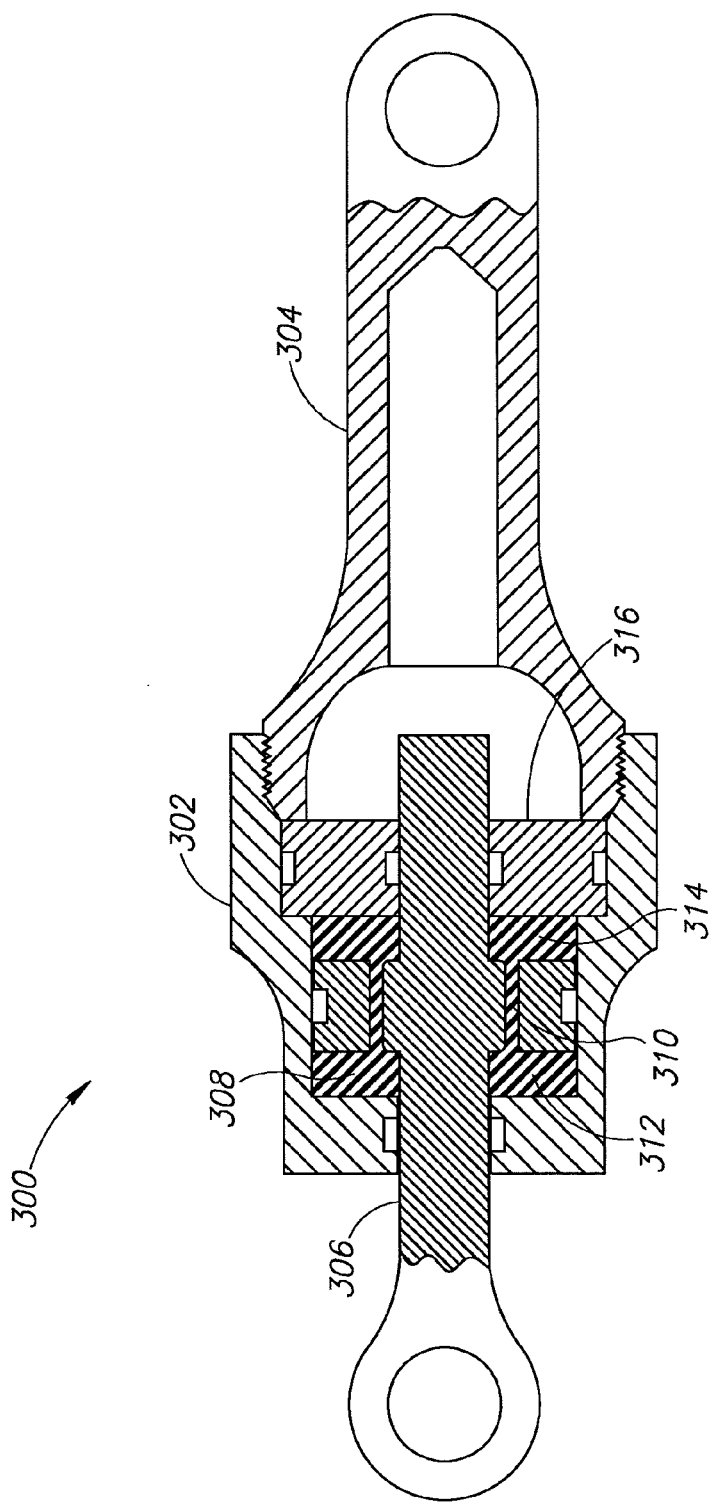
FIG. 3B shows a schematic, cross-sectional view of a damping assembly having a solid damping material with a flow orifice according to an embodiment of the present invention.
Figure 3C:
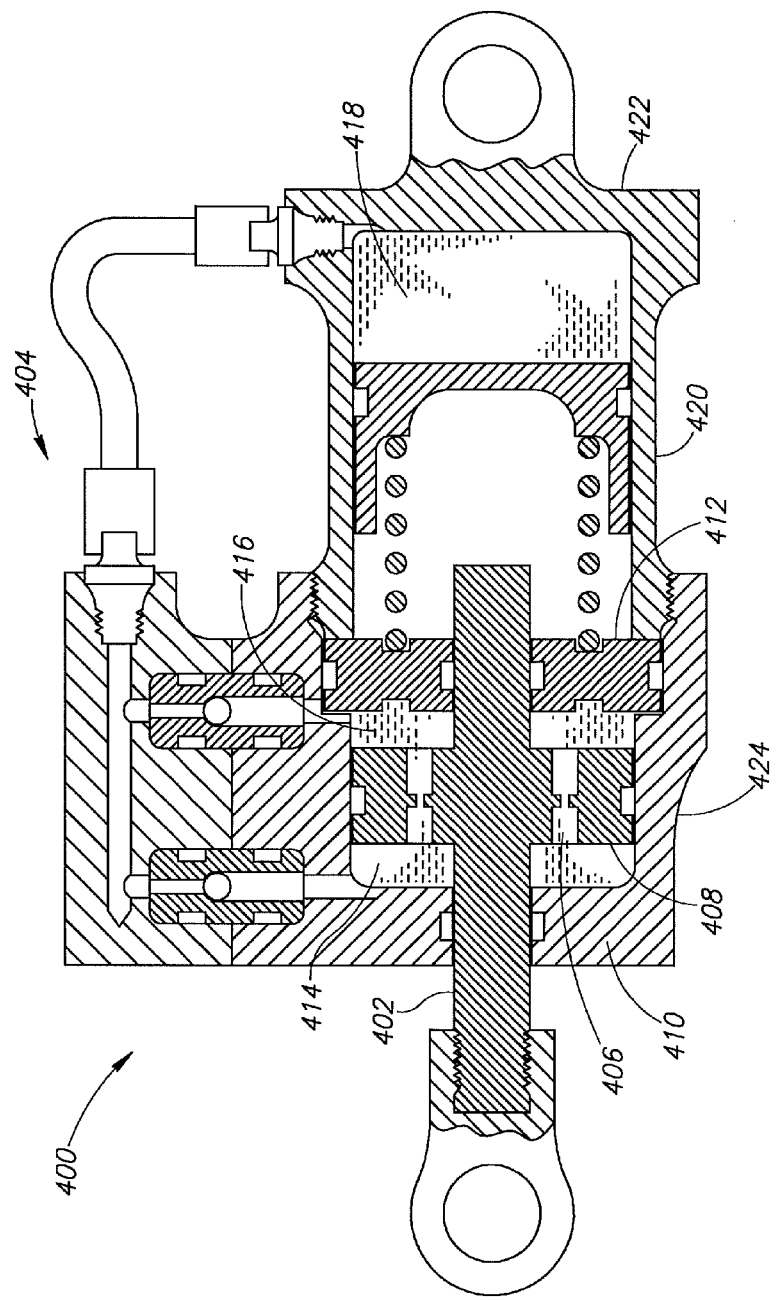
FIG. 3C shows a schematic, cross-sectional view of a damping assembly having a hydraulic circuit according to an embodiment of the present invention.

FIGS. 3A-3C show various devices that may be employed as the damping mechanism or assembly 110. The devices illustrated are meant to be only representative of how to damp out the motion of the beam member 108 with a damping mechanism 110 structurally incorporated into the torque link assembly 100.

FIG. 3A schematically shows an embodiment of a damping mechanism 200 having a cast solid media bonded between a rod and a cylinder to generate a desired amount of friction on the moving rod (e.g., coulomb damping). More specifically, the illustrated damping mechanism 200 includes a piston head 202 movable in a first cylinder portion 204 and a piston rod 206 movable in a second cylinder portion 208. A damping material 210 is located in a region between the piston rod 206 and an inner surface 212 of the second cylinder portion 208. The damping material 210 may take the form of a solid, yet deformable material. By way of example, the damping material 210 may take the form of a silicon or rubber material with or without a filler. In addition, the damping material 210 may take the form of a piezoelectric material, a magneto-rheostatic material, an electro-rheostatic material, or a shape memory alloy. A cavity 214 where the piston head 202 is located may include a compressible, semi-compressible or non-compressible fluid such as, but not limited to, a gas, a low viscosity liquid, or a high viscosity liquid or may be void. A mechanical stop 216 may be coupled to the piston head 202 and sized to contact an end wall 218 after the piston head 202 has moved a desired distance within the cavity 214. In operation, the damping material 210 and the fluid within the cavity 214 both operate to provide an amount of damping for the torque link assembly 100. A first mechanical stop 203 may be coupled to the piston head 202 and sized to contact a second mechanical stop 209 of the cylinder body 208 after the piston head has moved the desired distance with in a cavity 214. The mechanical stops 203 and 216 allow the damping mechanism 200 to react tensile or compression loads.

FIG. 3B schematically shows an embodiment of another type of damping mechanism 300 having a cast solid media that flows through an orifice. More specifically, the damping mechanism 300 includes a body 302 coupled to a structural link 304. A rod 306 received in the body 302 engages a damping material 308 that is permitted to flow through an orifice 310 extending between a first chamber 312 and a second chamber 314. A mechanical stop 316 is coupled to the body 302 and arranged to stop the rod 306 after the rod 306 has moved by a desired distance. A mechanical stop 318 is coupled to (or may be integral with) body 302 and arranged to stop the rod 306 after the rod 306 has moved the desired distance. When the rod 306 is engaged with the stop 316 or 318, the damping mechanism 300 operates as a rigid member.

FIG. 3C schematically shows an embodiment of another type of damping mechanism 400 with a hydraulic circuit having hydraulic fluid flowing through an orifice or the damping mechanism 400 may take the form of magnetic circuit having magnetorheological fluid flowing through a magnetized orifice. For purposes of brevity, the hydraulic circuit embodiment will be described herein. The damping mechanism 400 includes a piston rod 402 coupled to a hydraulic circuit 404 that operates as a hydraulic fluid damper. In the illustrated embodiment, the piston rod 402 includes a flow orifice or port 406 that extends through a piston head 408. The hydraulic circuit 404 may include multiple chambers 414, 416 and 418 in fluid communication with each other. In one embodiment, the chamber 418 operates as a reservoir to account for leakage and to provide a capacity to deal with changes in temperature, which may cause expansion or contraction of the hydraulic fluid. The damping mechanism 400 also includes a body 424 coupled to a rod end 422. A rod 402 received in the body 424. A mechanical stop 412 is coupled to the body 424 and arranged to stop the rod 402 after the rod 402 has moved by a desired distance. A mechanical stop 410 is coupled to (or may be integral with) body 424 and arranged to stop the rod 402 after the rod 402 has moved the desired distance. When the rod 402 is engaged with the stop 412 or 410, the damping mechanism 400 operates as a rigid member.

Referring back to FIG. 2A, the torque link assembly 100 functions as a cantilevered beam member 108 between points 112 and 114. Lateral, transverse or even torsional deformations in the beam member 108 may be damped out by operation of the damping mechanism 110. Such deformations are schematically indicated with arrows 116 at point 114. Although the arrows 116 is shown in the illustrated directions; it is appreciated that the deformations may be in other directions.

The damping mechanism 110 may be configured to damp out at least some, if not all, of the aforementioned deformations. In situations where the deformation of the beam member 108 becomes excessive, the damping mechanism 110 may be configured to bottom and act as a rigid member between points 114 and 118. In this bottoming out scenario, the torque link assembly 100 would react loads at point 114 through the beam member 108 acting as a tension or compression member and the bottomed-out damping mechanism 110 correspondingly acting as a compression or tension member, respectively. In one embodiment, the beam is designed for structural torque loads when combined with the bottomed-out damping mechanism 110; meaning the beam member 108 is sized for structural tension, compression, buckling or crippling, etc.

The illustrated embodiments each provide a torque link with integrated flexibility for damping out shimmy vibration and where the damping mechanism is structurally incorporated into the torque link (e.g., upper or lower torque link). In a lower torque link, the damping mechanism would be closer to the ground, which is the source of the vibrational loads, and therefore may be advantageously more effective. In addition, the described embodiments or variations thereof may be lighter since it could replace part of the torque link system rather than just adding a separate damping mechanism.

Figure 4B:
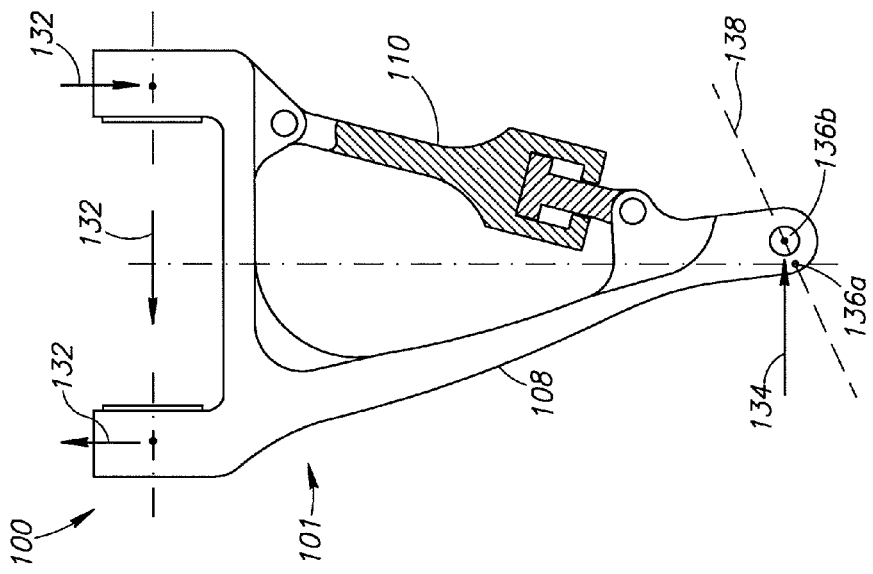
FIG. 4B shows a schematic top, plan view of the torque link assembly of FIG. 1 having a damper mechanism loaded under compression according to an embodiment of the present invention.
Figure 4A:
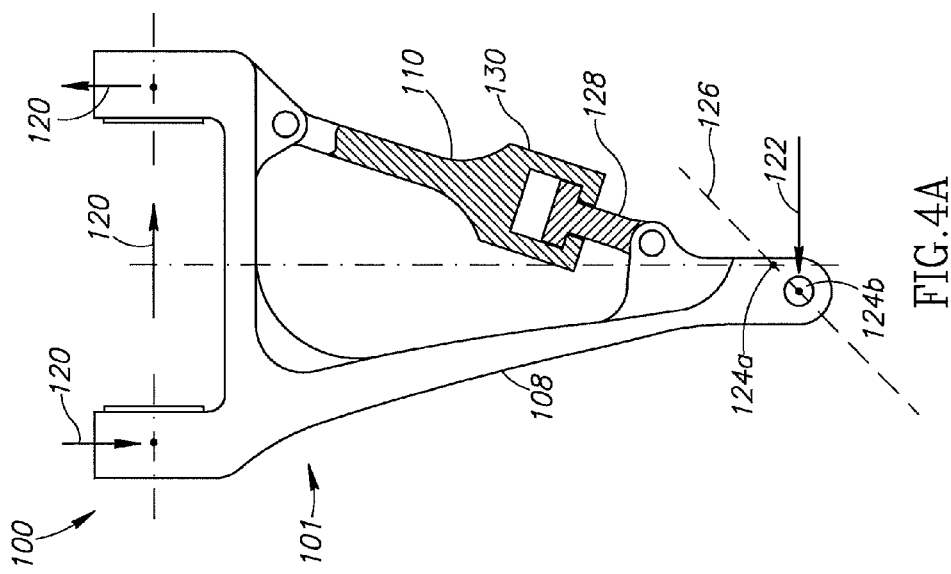
FIG. 4A shows a schematic top, plan view of the torque link assembly of FIG. 1 having a damper mechanism loaded under tension according to an embodiment of the present invention.

FIGS. 4A and 4B schematically shows how loading of the torque link assembly 100 and more specifically loading of the upper torque link 101 can change the stresses in the beam 108 and damping mechanism 110, respectively. FIG. 4A shows that loading of the torque link 101 as generally indicated by upper load vectors 120 and lower load vector 122 causes the damping mechanism 110 to "fully extend" and thus be placed under a tensile stress while the beam 108 is placed under compression and bending stresses. Under such a loading condition, the beam 108 may deflect from point 124a to point 124b along a line of action 126. In the illustrated embodiment, the deflection of the beam 108 is exaggerated to clarify the stress profile and operation of the torque link 101 under load with the damping mechanism 110 fully extended as schematically illustrated by a position of a piston 128 within a cylinder 130.

FIG. 4B shows the upper torque link 101 under an opposite loading condition as that from FIG. 4A. In particular, FIG. 4B shows that loading of the torque link 101 as generally indicated by upper load vectors 132 and lower load vector 134 causes the damping mechanism 110 to "bottom out" and thus be placed under a compressive stress while the beam 108 is placed under tension and bending stresses. Under this loading condition, the beam 108 may deflect from point 136a to point 136b along a line of action 138. In the illustrated embodiment, the deflection of the beam 108 is exaggerated to clarify the stress profile and operation of the torque link 101 under load with the damping mechanism 110 bottomed out as schematically illustrated by the position of the piston 128 within the cylinder 130.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A landing gear for an aircraft comprising:
a shock strut including a shock strut piston and shock strut cylinder in sliding engagement with one another; and
a torque linkage operatively mounted between the shock strut piston and shock strut cylinder to develop torque therebetween, wherein the torque linkage includes at least one torque link, wherein the torque link includes:
a clevis portion;
a lug portion distally located from the clevis portion; and
a shimmy damper assembly having two load carrying arms each extending substantially between the clevis portion and the lug portion, the first arm including a beam member having a predetermined stiffness, wherein the beam member is cantilevered to the clevis portion, the second arm including a damper assembly, wherein the beam member and damper assembly cooperate as a spring-damper system integrated into the torque link and provide a predetermined structured load path under loads.

2. The landing gear as recited in claim 1, wherein the first arm includes a constant cross-sectional thickness.

3. The landing gear as recited in claim 1, wherein the first arm includes a non-constant cross-sectional thickness.

4. The landing gear as recited in claim 1, wherein the first arm is integrally formed with at least one of either the clevis portion or the lug portion.

5. The landing gear as recited in claim 1, wherein the second arm is pin-connected to the clevis portion and the lug portion, respectively.

6. The landing gear as recited in claim 1, wherein the shimmy damper assembly includes a cast media damping material.

7. The landing gear as recited in claim 1, wherein the shimmy damper assembly includes a solid damping material having a hydraulic orifice to permit fluid communication through the damping material.

8. The landing gear as recited in claim 1, wherein the shimmy damper assembly includes a hydraulic circuit.

9. The landing gear as recited in claim 1, wherein the shimmy damper assembly includes a magnetorheological material having an orifice to permit fluid communication through the material.

10. The landing gear as recited in claim 1, wherein the shimmy damper assembly includes a rod frictionally received in and movable within a channel to provide an amount of damping.

11. A landing gear for an aircraft comprising:
a shock strut including a shock strut piston and shock strut cylinder in sliding engagement with one another; and
a torque linkage operatively mounted between the shock strut piston and shock strut cylinder to develop torque therebetween, wherein the torque linkage includes at least one torque link, wherein the torque link includes:
a clevis portion;
a lug portion distally located from the clevis portion;
a rigid beam member extending between the clevis portion and the lug portion, the rigid beam arranged as a first arm of the torque link, wherein the beam is cantilevered to the clevis portion; and
a shimmy damper mechanism coupled to the clevis portion and the lug portion, the shimmy damper arranged as a second arm of the torque link, the shimmy damper mechanism configured to dampen deflections of the rigid beam member under loading up to a first threshold and also configured to operate as a rigid structural member under loading that exceeds the first threshold.

12. The landing gear as recited in claim 11, wherein the rigid beam member includes a cross-sectional thickness that varies along a length of the beam member.

13. The landing gear as recited in claim 11, wherein the shimmy damper mechanism includes a cast media damping material.

14. The landing gear as recited in claim 11, wherein the shimmy damper mechanism includes a solid damping material having a hydraulic orifice to permit fluid communication through the damping material.

15. The landing gear as recited in claim 11, wherein the shimmy damper mechanism includes a hydraulic circuit.

16. The landing gear as recited in claim 11, wherein the shimmy damper mechanism includes a magnetorheological material having an orifice to permit fluid communication through the material.

17. The landing gear as recited in claim 11, wherein the shimmy damper mechanism includes a rod frictionally received in and movable within a channel to provide an amount of damping.

18. The landing gear as recited in claim 11, wherein the first arm includes a constant cross-sectional thickness.

19. The landing gear as recited in claim 11, wherein the first arm is integrally formed with at least one of either the clevis portion or the lug portion.

20. The landing gear as recited in claim 11, wherein the second arm is pin-connected to the clevis portion and the lug portion, respectively.

* * * * *